United States Patent [19]
Harken et al.

[11] 3,774,093
[45] Nov. 20, 1973

[54] DRIVE DEVICE FOR BACK AND FORTH MOVEMENT

[75] Inventors: Claus Harken; Armin Germer, both of Berlin, Germany

[73] Assignee: Licentia Patent-Verwaltungs-GmbH, Frankfurt am Main, Germany

[22] Filed: June 28, 1972

[21] Appl. No.: 267,156

[30] Foreign Application Priority Data
June 29, 1971 Germany.................. P 21 32 859.6

[52] U.S. Cl...................... 318/135, 310/20, 310/37, 310/83, 318/282
[51] Int. Cl. ........................................... H02k 41/02
[58] Field of Search .................. 310/20, 37, 80, 83, 310/84; 318/135, 282

[56] References Cited
UNITED STATES PATENTS

| | | | |
|---|---|---|---|
| 3,167,671 | 1/1965 | Staak | 310/83 |
| 3,512,019 | 5/1970 | Durand | 310/83 X |
| 2,978,621 | 4/1961 | Martinek | 310/83 X |
| 3,278,774 | 10/1966 | Roller et al. | 310/80 X |
| 3,402,308 | 9/1968 | Henschke | 310/80 |

FOREIGN PATENTS OR APPLICATIONS
1,579,497   7/1969   France................................ 318/135

*Primary Examiner*—Gerald Goldberg
*Attorney*—George H. Spencer et al.

[57] ABSTRACT

A device receiving power from an electric supply source and providing a drive for a back and forth movement between two end points. An electric motor in the device is a magnet-rotor synchronous motor which reverses its direction of rotation after each stop. The motor shaft is coupled to a driving element, and a follower, operatively associated with this element, is axially displaceable along the element when the element is rotated by the motor. Abutments at each end point define the limits of travel of the follower in each direction.

14 Claims, 4 Drawing Figures

PATENTED NOV 20 1973
3,774,093

DRIVE DEVICE FOR BACK AND FORTH MOVEMENT

BACKGROUND OF THE INVENTION

The present invention relates to a driving device for subjecting a follower member to a back and forth movement between two end points. The device has at least one magnetic-rotor synchronous motor which starts turning in the direction opposite to that of its previous rotation after each stop. A helical or screw-type element is connected with the motor shaft and is rotatable about its longitudinal axis. A follower engages this element and is axially displaceable between abutments disposed at the end points.

Such drives are used, for example, for opening and closing curtains, drapes and the like. Drives are known for such purposes in which a motor is combined with a crank and a pulley. Such devices must be switched off at the end points of the path of movement and in addition switches must be provided to reverse the motor. In this known type of drive for a back and forth movement, it is not only necessary to install the wires to the switches but the pulleys must also be very carefully installed so that no difficulties will arise during operation of the drive.

A curtain or drapery drive is also known in which an endlessly rotating cord moves between the end points of the path of movement. Here the reversal of the direction of movement is mechanical, in that a follower is coupled at one time with the forward reach and at one time with the return reach of the cord.

SUMMARY OF THE INVENTION

It is an object of the present invention to avoid the problems encountered in known devices by providing a device in which the back and forth movement between two end points is achieved by using at least one electric motor.

It is a further object of the invention to provide a device which is electrically and mechanically simple in construction and which is not complicated to install, or operate, and to maintain.

This is accomplished according to the present invention by a drive in which there is at least one magnetic-rotor synchronous motor which starts up in the opposite direction from its previous rotation after having been stopped. An element is connected with the shaft of the motor to be rotatable about its axis and a follower is disposed to engage the element and is moved by rotation of the element in an axial direction between the end points of its travel path.

The helical or screw-type element according to the present invention may be a rigid screw, or it may be a helical spring made from spring steel wire, a worm made from flexible plastic material, etc. If the helical or screw-type element is flexible, it is preferably guided, according to the present invention, in a longitudinally slit guide tube. The guide tube may either be rigid or flexible and may consist, for example, of a flexible plastic material. In many cases the guide tube may simultaneously serve, according to the present invention, as a guide rail for the particular arrangement which is driven by the drive device. The guide tube may advantageously be formed as a combined unit with the motor housing or it may be separately attached thereto.

According to the present invention it is also proposed to connect the guide tube with the motor housing via a connecting piece which is, for example, an injection molded plastic part. When such a connecting piece is used the motor housing as well as the guide tube are inserted into suitable recesses in the connecting piece.

In order to permit automatic stopping of the motor when the follower has reached an abutment at one of the end points of its travel path, the present invention provides that an electrical switch be disposed on the motor shaft. This switch is connected in the electrical circuit for the motor and is arranged to interrupt the current supply when the motor is stopped. This electrical switch, which is connected with the shaft of the motor, for example through a friction bearing, may be accommodated in a housing within the connecting piece disposed between the motor housing and the guide tube.

The electrical switch which is connected with the motor shaft through a friction bearing must be bridged by another electrical switch in the current supply circuit of the motor in order to start the motor and in order to be able to prevent in certain cases undesired stoppage at the reversal points.

If the helical or screw-type element is flexible, it is not necessary for the back and forth movement between the end points to take place along a straight line. The helical or screw-type element is fastened either directly on the motor shaft or on an intermediate sleeve slipped onto the motor shaft. The magnetic-rotor synchronous motor may be provided with a sleeve type extension on its housing through which it can be easily placed onto the guide tube. In order to assure a firm seat of the motor in the guide tube, or of the motor and the guide tube in an intermediate connecting piece, it is useful to provide a catch at the coupling points.

The drive according to the present invention may advantageously be used as a drive for curtains and drapes. In this arrangement the guide tube for the helical or screw-type element simultaneously serves as the support rail for the curtain and drapery rollers.

If the drive is used to drive a curtain or drape, it is advisable for the follower to engage in the helical or screwtype element in such a manner that it can be disengaged when manual operation is desired.

DESCRIPTION OF THE PREFERRED EMBODIMENTS

Figure 1:
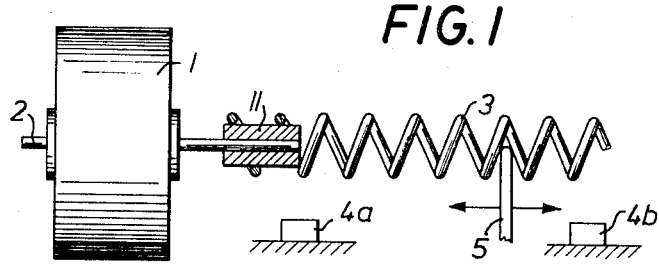
FIG. 1 is a partially cross-sectional pictorial elevational view of one embodiment of a device according to the present invention.

Referring to FIG. 1, a magnetic-rotor synchronous motor 1 has a shaft 2 which is connected, through an intermediate piece 11, to a helical element 3 so as to drive this element in a rotating movement.

A follower 5 which engages into the helical path of element 3 is caused to move back and forth between the abutments 4a and 4b disposed at the end points of the drive. The present invention makes use of the fact that a synchronous motor of the type employed here tends to start up in the opposite direction from its previous direction of rotation once its previous rotation has been braked or stopped. Thus, if follower 5 reaches one of abutments 4a or 4b, this stops the motor 1 which then starts up again with shaft 2 rotating in the opposite direction. Follower 5 then moves linearly in the opposite direction toward the other abutment without the need for switching the motor. Therefore, the back and forth movement can be effected without the need to have electrical switches associated with the abutments 4a and 4b. Such motors are generally known and therefore not illustrated in detail. The rotor of a magnetic-rotor synchronous motor of known construction has a plurality of permanently magnetized poles. For example, a permanent magnet, magnetized in an axial direction, is disposed on the shaft and external magnetic flux between the north and south poles is conducted to the radial air gap through soft-magnetic metal sheets each connected to a respective pole. At the air gap these metal sheets are each provided, for example, with eight claws which mesh in one another in such a manner that 8 north poles and eight south poles are created in alternating sequence. In a similar manner an annular coil, connected to a source of alternating voltage, produces a stator field with the same number of poles. Here, too, the flux is conducted to the air gap through metal sheets provided with claws. Such a motor has no defined starting direction but rather the permanent magnetic-rotor is first caused to perform rotary oscillations by the highly polarized alternating field produced by the stator. A magnetic-rotor synchronous motor of this type, having such an arrangement for a socalled vibration start, is illustrated in the U.S. Pat. No. 2,432,573.

Figure 2:
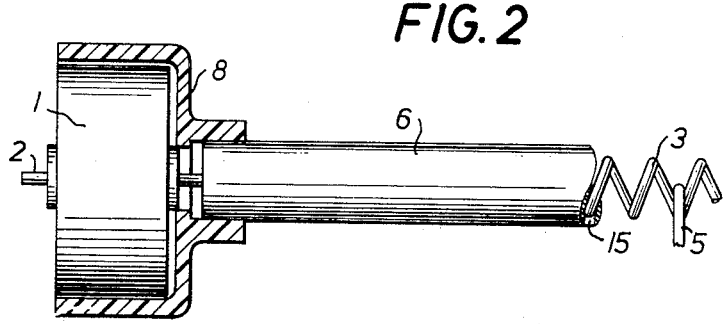
FIG. 2 is a view similar to that of FIG. 1 of another arrangement of the invention.

In order to guide the element 3 it may be accommodated in a slitted guide tube 6 as shown in FIG. 2. The guide tube 6 is shown combined into a unit with the motor 1 through the use of a connecting piece 8 into which an extension on the motor housing is inserted. Follower 5, extends through a slit 15 in the guide tube 6.

Figure 4:
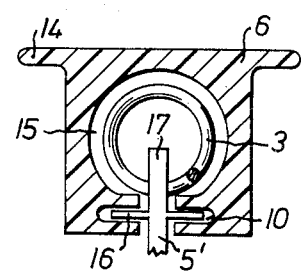
FIG. 4 is a cross-sectional view of one type of guide tube used in devices according to the invention.

In a particular embodiment of the guide tube 6, shown, for example, in FIG. 4, follower 5 may be guided for lengthwise movement in the guide by a guide rail 10 provided in the guide tube itself. This arrangement provides for a smooth movement of the follower within the guide and prevents twisting. The guide tube 6 as shown in section in FIG. 4, is particularly well suited for a drive for curtains. The guide rail 10 then accommodates not only the followers 5' but also the drapery rollers or slides. The guide tube 6 is provided with protrusions 14 which serve to fasten it to a support. One end side of the curtain is to be fastened to the follower 5'. A lot of slides are fastened to the curtain, distributed all over its length. The slides are similarly formed like the follower 5'. Both have guiding arms 16 which extend into the lefthand part and into the righthand part of the guide rail 10, but only the followers 5' are furnished by an elongation 17 engaged into the helical path of element 3.

Figure 3:
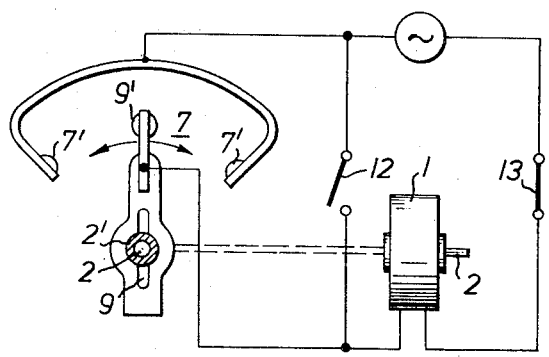
FIG. 3 is a schematic view of a circuit arrangement for the operation of a motor in the device according to the invention.

If the back and forth movement is to be stopped when the follower 5 reaches one of the abutments 4a or 4b, an electrical switch arrangement is recommended in order to keep the current supply circuit for the motor closed as long as the motor rotates in one direction. Such a switch 7 is shown in FIG. 3. The switching member 9 of switch 7 is connected with the shaft 2 of the motor through a known type of friction bearing 2'. The friction bearing 2' is nonrotatably fixed to the switching member 9 but slidably mounted on the shaft 2. The switching member 9 is actuated for moving towards one of the contacts 7' by forces due to friction between shaft 2 and friction bearing 2'. If the shaft 2 rotates in the counterclockwise direction the contact 9' of the switching member quickly comes to lie against the left-hand contact 7' of switch 7 and against the right hand contact when the shaft rotates in the opposite direction. If the movement of follower 5 is stopped and shaft 2 ceases to rotate, switch 7 opens the current supply circuit for motor 1. For the renewed starting of the motor 1, switch 7 may be bridged momentarily by means of an electrical switch 12 connected in parallel with the electrical switch 7. Electrical switch 13, shown in closed position, in the current supply circuit of the motor, can be opened to stop the motor at any desired point in the movement of follower 5. When switch 13 is reclosed, the motor 1 can be started again by actuating the switch 12, but the direction of starting will be indefinite. If the motor starts in nondesired direction, its direction will be reversed when the follower 5 is stopped by one of the abutments 4a or 4b.

The advantages of the drive device according to the present invention are, in particular, its simple electrical and mechanical arrangement as well as its easy installation and operation. In addition the device requires only a minimum amount of maintenance. When the drive device is used as a curtain drive there is the additional advantage that the guide tube for the follower may simultaneously be designed as a guide rail for the curtain slides. As one possibility the guide rail can be installed in the curtain rod itself without any particular difficulties.

It will be understood that the above description of the present invention is susceptible to various modifications, changes and adaptations, and the same are intended to be comprehended within the meaning and range of equivalents of the appended claims.

We claim:

1. A drive device for subjecting a follower to back and forth movement between end points, comprising:
    a. a magnetic-rotor synchronous motor operatively connected to a source of alternating current, said motor being started in either one of the two directions of rotation by vibration start;
    b. a shaft on said rotor;
    c. means defining an element with helical turns, said element being coupled to said shaft and disposed to be rotated about its longitudinal axis by said shaft;
    d. abutment means disposed at the end points;
    e. a follower operatively engaged in the helical turns of said element to be axially displaceable along said element and between said abutment means while being secured against rotation;
    f. a slitted guide tube containing said element;
    g. a housing containing said motor, said guide tube being connected to said housing;
    h. a connecting piece and an extension on said motor housing; said guide tube and said extension being inserted into said connecting piece to connect said guide tube and said motor housing;
    i. a current supply circuit connected between the source of alternating current and said motor;
    j. electrical switch means in said circuit, said switch means having a switching member and a pair of stationary contacts;

k. means operatively connecting said switching member to said shaft of said motor; and l. a manually actuatable switch connected in a bridging arrangement between said switching member and said stationary contacts, whereby when said shaft is rotated in one direction said switching member is moved to one of said pair of stationary contacts to close said circuit to said motor and, when said shaft is rotated in the opposite direction, said switching member is moved to the other of said stationary contacts to again close said circuit to said motor.

2. A drive device for subjecting a member to back and forth movement between end points, comprising in combination:

a. a magnetic-rotor synchronous motor including a shaft attached to said rotor, said motor being startable in either one of the two senses of rotation by vibration start;

b. means defining an element with helical turns, said element being coupled to said shaft and disposed to be rotated about its longitudinal axis by said shaft;

c. abutment means disposed at the end points;

d. a follower, constituting said member, operatively engaged in the helical turns of said element to be axially displaceable along said element and between said abutment means while being secured against rotation;

e. a current supply circuit connecting an a.c. source to said motor to operate the same;

f. a first electrical switch means contained in said circuit and having stationary contact means and a switching member being movable into a circuit-closing position in which it is in engagement with said stationary contact means and into a circuit-opening position in which it is out of contact with said stationary contact means;

g. means operatively connecting said switching member to said shaft for moving said switching member into and maintaining it in said circuit-closing position in response to and during the rotation of said shaft and for moving said switching member into and maintaining it in said circuit-opening position in response to and during stoppage of said shaft; and h. an arbitrarily actuatable second electrical switch means connected in parallel with said first switch means, said second switch means having a circuit-opening position and a circuit-closing position; in the circuit-closing position of said second switch means said first switch means is short-circuited, whereby said motor is supplied with current independently from the positions of said first switch means.

3. A device as defined in claim 2, wherein said stationary contact means of said first electrical switch means includes two spaced first and second stationary contacts; said switching member being movable into a first circuit-closing position in which it is in engagement with said first stationary contact, said switching member being movable into a second circuit-closing position in which it is in engagement with said second stationary contact; said means operatively connecting said switching member to said shaft causes said shaft to move said switching member into and maintain it in said first circuit-closing position during the rotation of said shaft in one sense and causes said shaft to move said switching member into and maintain it in said second circuit-closing position during the rotation of said shaft in the other sense.

4. A device as defined in claim 2, wherein said element is a helical spring.

5. A device as defined in claim 4, wherein said helical spring is of spring steel wire.

6. A device as defined in claim 2, wherein said element is a worm formed of flexible plastic material.

7. A device as defined in claim 2, further comprising a slitted guide tube and wherein said element is disposed in said tube.

8. A device as defined in claim 7, wherein said guide tube is made of flexible plastic material.

9. A device as defined in claim 8, further comprising means associated with said follower and driven thereby, and means defining a guide rail in said guide tube, and wherein said means associated with said follower and said follower are both operatively engaged in said guide rail for movement therealong.

10. A device as defined in claim 9 wherein said means associated with said follower include slides for supporting curtains and drapes and said slides are received in said guide rail.

11. A device as defined in claim 7 wherein said motor has a housing and said guide tube is connected with said housing.

12. A device as defined in claim 11 further comprising a connecting piece and an extension on said motor housing, and wherein said guide tube and said extension are inserted into said connecting piece to connect said guide tube and said motor housing.

13. A device as defined in claim 2, when said means operatively connecting said switching member to said shaft is a friction bearing.

14. A device as defined in claim 12, further comprising means defining a housing in said connecting piece, and said electrical switch means is received in said housing.

* * * * *